(12) United States Patent
Kawauchi

(10) Patent No.: US 12,298,737 B2
(45) Date of Patent: May 13, 2025

(54) INFORMATION PROCESSING APPARATUS, INFORMATION PROCESSING METHOD, ARTICLE MANUFACTURING SYSTEM, AND ARTICLE MANUFACTURING METHOD

(71) Applicant: CANON KABUSHIKI KAISHA, Tokyo (JP)

(72) Inventor: Yoshihiro Kawauchi, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 612 days.

(21) Appl. No.: 17/589,485

(22) Filed: Jan. 31, 2022

(65) Prior Publication Data
US 2022/0244700 A1 Aug. 4, 2022

(30) Foreign Application Priority Data
Feb. 4, 2021 (JP) .................................. 2021-016442

(51) Int. Cl.
| | | |
|---|---|---|
| G06F 3/14 | (2006.01) | |
| B41M 3/00 | (2006.01) | |
| G05B 19/409 | (2006.01) | |

(52) U.S. Cl.
CPC ............ G05B 19/409 (2013.01); B41M 3/00 (2013.01); G06F 3/14 (2013.01); *G05B 2219/32128* (2013.01); *G05B 2219/36072* (2013.01)

(58) Field of Classification Search
CPC ........ G05B 19/409; G05B 2219/32128; G05B 2219/36072; G05B 23/0272; G05B 23/0216; G05B 23/0221; G05B 2219/2602; B41M 3/00; G06F 3/14; G06F 3/0481; G06F 3/048; G09G 5/003; G09G 5/14; G03F 7/70483; G03F 7/20; H01L 21/027
See application file for complete search history.

(56) References Cited

U.S. PATENT DOCUMENTS

| | | | | |
|---|---|---|---|---|
| 7,996,873 B1* | 8/2011 | Nathan | ............... | H04N 21/8113 |
| | | | | 725/144 |
| 2013/0086521 A1* | 4/2013 | Grossele | ................. | G05B 15/02 |
| | | | | 715/810 |
| 2014/0025677 A1* | 1/2014 | Asai | ......................... | G06F 16/13 |
| | | | | 707/737 |
| 2015/0234379 A1* | 8/2015 | Vajaria | .................... | H01L 22/12 |
| | | | | 700/121 |

(Continued)

FOREIGN PATENT DOCUMENTS

| | | |
|---|---|---|
| CN | 110073396 A | 7/2019 |
| CN | 111913613 A | 11/2020 |

(Continued)

*Primary Examiner* — Charles Cai

(74) *Attorney, Agent, or Firm* — Canon U.S.A., Inc. IP Division

(57) ABSTRACT

An information processing apparatus includes an acquisition unit configured to acquire information including first processing data indicating a result of substrate processing performed by a first substrate processing apparatus, and second processing data indicating a result of substrate processing performed by a second substrate processing apparatus different from the first substrate processing apparatus, and a display control unit configured to control display on a display device based on the information acquired by the acquisition unit. The display control unit displays the first processing data and the second processing data in different regions.

17 Claims, 11 Drawing Sheets

(56) References Cited

U.S. PATENT DOCUMENTS

| | | | |
|---|---|---|---|
| 2020/0388518 A1* | 12/2020 | Mungekar | H01L 21/68 |
| 2021/0071229 A1* | 3/2021 | Janssen | C12Q 1/37 |
| 2023/0177673 A1* | 6/2023 | Maruyama | G01N 23/2251 |
| | | | 382/149 |

FOREIGN PATENT DOCUMENTS

| | | | |
|---|---|---|---|
| JP | 2004153228 A | | 5/2004 |
| JP | 2005093922 A | | 4/2005 |
| JP | 2009170612 A | | 7/2009 |
| JP | 2011129580 A | * | 6/2011 |
| TW | 200809449 A | | 2/2008 |
| TW | 200848964 A | | 12/2008 |
| TW | 201237577 A | | 9/2012 |
| TW | 201333654 A | | 8/2013 |
| TW | 201736998 A | | 10/2017 |
| TW | 201812850 A | | 4/2018 |
| TW | 201923555 A | | 6/2019 |
| WO | 2006059625 A1 | | 6/2006 |

* cited by examiner

INFORMATION PROCESSING APPARATUS, INFORMATION PROCESSING METHOD, ARTICLE MANUFACTURING SYSTEM, AND ARTICLE MANUFACTURING METHOD

BACKGROUND

Field of the Disclosure

The present disclosure relates to an information processing apparatus, an information processing method, an article manufacturing system, and an article manufacturing method.

Description of the Related Art

In a factory that manufactures devices such as semiconductors, manufacturing apparatuses such as substrate processing apparatuses for processing substrates are normally installed. To process the substrates efficiently, it is necessary to keep track of the operating status of each of the manufacturing apparatuses. In addition, in a case where an abnormality occurs in the manufacturing apparatuses, it is necessary to immediately handle the abnormality.

Japanese Patent Application Laid-Open No. 2009-170612 discusses a technique for, to detect an abnormality in manufacturing apparatuses, performing statistical processing on processing results of the manufacturing apparatuses for each lot including a plurality of substrates, and displaying results of the statistical processing in graph form. This enables a user to immediately recognize a lot in which an abnormality occurs.

However, if the graph is displayed on a lot-by-lot basis, it is difficult to immediately determine what tendency the statistical processing result of each of the apparatuses has. For example, in a case where an abnormality occurs in a particular apparatus, an abnormality can occur in data indicating the statistical processing results independently of the lots. In this case, even if the data indicating the statistical processing results on a lot-by-lot-basis is displayed in graph form, it is difficult to easily identify the cause of the abnormality, and it may take much time to eliminate the abnormality that has occurred.

SUMMARY

According to an aspect of the present disclosure, an information processing apparatus includes an acquisition unit configured to acquire information including first processing data indicating a result of substrate processing performed by a first substrate processing apparatus, and second processing data indicating a result of substrate processing performed by a second substrate processing apparatus different from the first substrate processing apparatus, and a display control unit configured to control display on a display device based on the information acquired by the acquisition unit. The display control unit displays the first processing data and the second processing data in different regions.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

Figure 1:
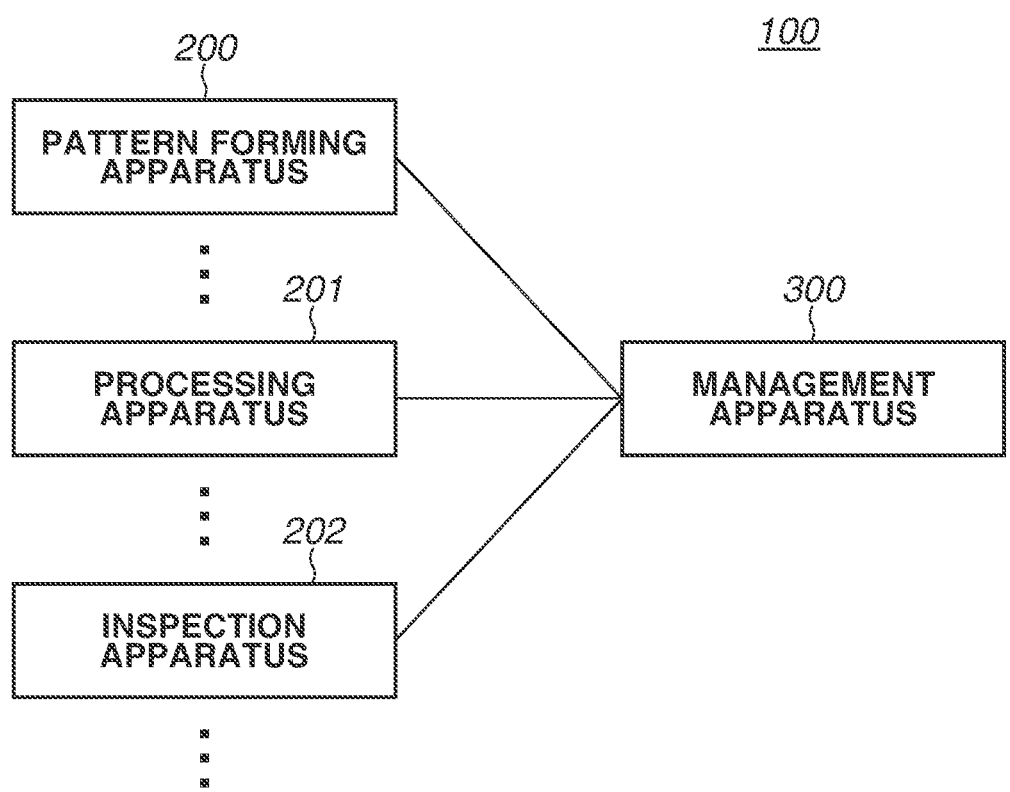
FIG. 1 is a diagram illustrating an article manufacturing system.

In a first exemplary embodiment of the present disclosure, an article manufacturing system including a plurality of apparatuses and a management apparatus that manages the plurality of apparatuses will be described. FIG. 1 illustrates an article manufacturing system 100 as the article manufacturing system according to the present exemplary embodiment. The article manufacturing system 100 includes a pattern forming apparatus 200 that forms a pattern on a wafer (a substrate), a processing apparatus 201, and an inspection apparatus 202, and a management apparatus 300 that manages the pattern forming apparatus 200, the processing apparatus 201, and the inspection apparatus 202.

In the article manufacturing system 100, each of the pattern forming apparatus 200, the processing apparatus 201, and the inspection apparatus 202 includes one or more apparatuses.

Examples of the pattern forming apparatus 200 include an exposure apparatus 204 (described below) that emits light to a reticle (a mask or an original) on which a pattern is formed and projects the pattern onto a shot region on a wafer with the light from the reticle. Examples of the pattern forming apparatus 200 also include an imprint apparatus that brings an imprint material supplied on a wafer and a mold (an original) into contact with each other and applies curing energy to the imprint material to form a composition to which a pattern shape of the mold is transferred. Examples of the pattern forming apparatus 200 also include a drawing apparatus that performs drawing on a substrate with a charged particle beam, such as an electron beam or an ion beam, through a charged particle optical system to form a pattern on the substrate. The pattern forming apparatus 200 performs substrate processing using such methods.

Examples of the processing apparatus 201 include manufacturing apparatuses that perform processes other than the process performed by an apparatus such as the exposure apparatus 204 in the manufacturing of articles such as devices. Examples of the manufacturing apparatuses include an application apparatus that applies a photosensitive material to the surface of a substrate, and a developing apparatus that develops a substrate to which a pattern is transferred. In addition to these apparatuses, examples of the processing apparatus 201 include an etching apparatus and a film forming apparatus.

Examples of the inspection apparatus 202 include an overlay inspection apparatus, a line width inspection apparatus, a pattern inspection apparatus, and an electrical characteristic inspection apparatus. The overlay inspection apparatus is used to inspect, in a substrate with patterns formed on multiple layers, alignment accuracy between the pattern on the upper layer and the pattern on the lower layer. The line width inspection apparatus is used to inspect dimensional accuracy, such as line width accuracy, of a pattern formed on a substrate. The pattern inspection apparatus is used to inspect the presence or absence of foreign matter adhering to the surface of a substrate on which a pattern is formed, and the presence or absence of a pattern that does not satisfy accuracy requirements due to a substrate not being filled with an imprint material. The electrical characteristic inspection apparatus is used to inspect accuracy of electrical characteristics of a semiconductor device manufactured from a substrate on which a pattern is formed.

Figure 2:
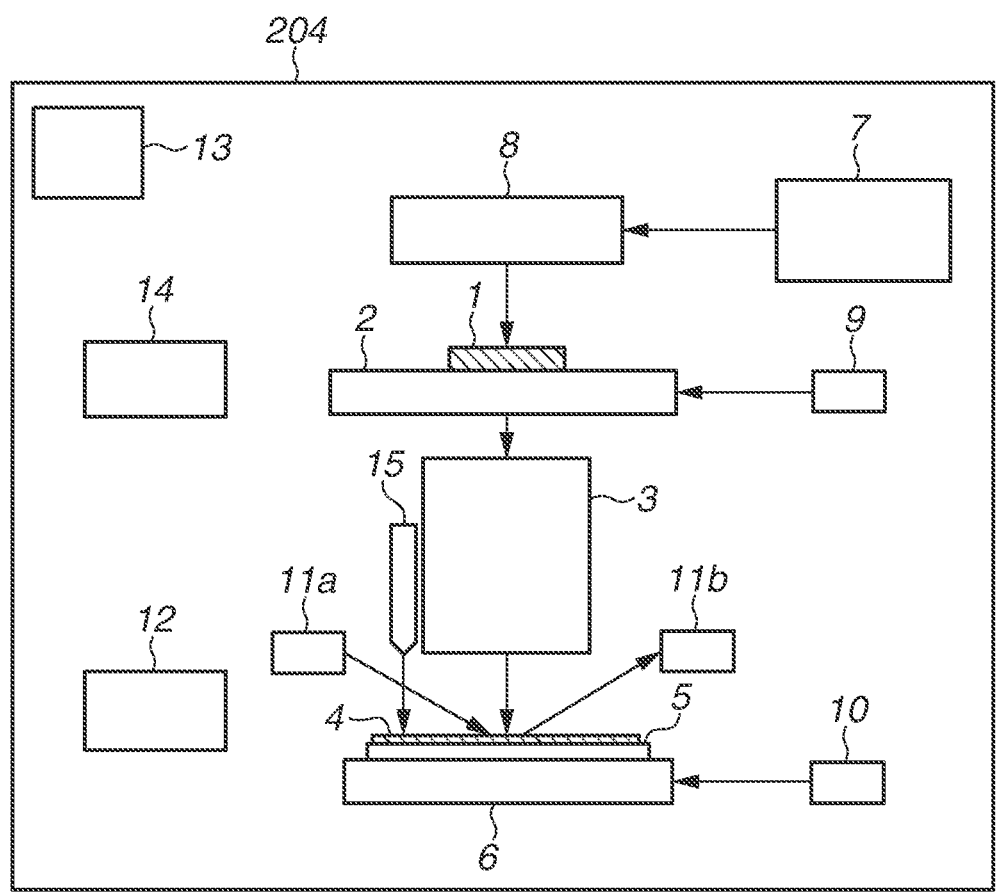
FIG. 2 is a diagram illustrating a configuration of an exposure apparatus as an example of a pattern forming apparatus.

Next, the exposure apparatus 204 that exposes a wafer with light from a reticle on which a pattern is formed will be described as an example of the pattern forming apparatus 200. FIG. 2 illustrates the exposure apparatus 204 as an example of the pattern forming apparatus 200. The exposure apparatus 204 according to the present exemplary embodiment will be described as a step-and-scan exposure apparatus that exposes a wafer 4 while synchronously driving a reticle stage 2 and a wafer stage 6. The exposure apparatus 204 is not limited to a scanner, and may be a step-and-repeat exposure apparatus that exposes the wafer 4 in a state where the wafer stage 6 is at rest. In the example of FIG. 2, the exposure apparatus 204 includes a light source 7, an illumination optical system 8, the reticle stage 2, a projection optical system 3, the wafer stage 6, a wafer chuck 5, and a control unit 13. The exposure apparatus 204 further includes a laser interferometer 9, a laser interferometer 10, a focus sensor 11, a wafer conveyance unit 12, a reticle conveyance unit 14, and an alignment scope 15. In FIG. 2, a direction parallel to an optical axis of the projection optical system 3 is a Z-axis direction, and two directions orthogonal to each other in a plane perpendicular to the Z-axis direction are an X-axis direction and a Y-axis direction.

Examples of the light source 7 include a high-pressure mercury lamp, an argon fluoride (ArF) excimer laser, and a krypton fluoride (KrF) excimer laser. The light source 7 may not necessarily be located inside a chamber of the exposure apparatus 204, and may be provided outside the chamber. Light emitted from the light source 7 illuminates a reticle 1 through the illumination optical system 8. On the reticle 1, a pattern to be transferred to the wafer 4 to which a photosensitive material is applied is drawn. The reticle 1 is mounted on the reticle stage 2. The reticle stage 2 suctions and holds the reticle 1 through a reticle chuck, and for example, is configured to be moved by a linear motor.

The projection optical system 3 projects an image of the pattern drawn on the reticle 1, onto the wafer 4 placed on the wafer chuck 5. When the image of the pattern is to be projected onto the wafer 4, the image obtained by inverting and reducing the image of the pattern with a projection magnification (e.g., 25%) through the projection optical system 3 is projected onto the wafer 4.

A plurality of shot regions is set on the wafer 4, and the image of the pattern is projected onto the shot regions in a sequential and repeated manner.

The wafer stage 6 can be driven to move in the X-direction and the Y-direction by an actuator such as a linear motor. The wafer chuck 5 is mounted on the wafer stage 6 and holds the wafer 4. The wafer 4 held by the wafer chuck 5 is moved by the driving of the wafer stage 6 and the wafer chuck 5.

The laser interferometer 9 measures the position in the Y-direction of the reticle stage 2 and measures the orientation of the reticle stage 2. The laser interferometer 9 includes a laser interferometer for measuring the position in the X-direction of the reticle stage 2 in a similar manner. The laser interferometer 10 measures the position in the Y-direction of the wafer stage 6 on which the wafer 4 is mounted, and measures the orientation of the wafer stage 6. The laser interferometer 10 includes a laser interferometer for measuring the position in the X-direction of the wafer stage 6 in a similar manner. The positions of the reticle stage 2 and the wafer stage 6 are controlled by the control unit 13 (described below) based on the positions measured by the laser interferometers 9 and 10, respectively.

The focus sensor 11 includes a light projection system 11*a* that projects light onto the wafer 4, a light reception system 11*b* that receives the reflected light from the wafer 4, and a detection unit that detects the light from the light reception system 11*b* and outputs a detection signal to the control unit 13. The light projection systems 11*a* and 11*b* are installed so that a light emission portion of the projection optical system 3 and an area around the light emission portion are located between the light projection systems 11*a* and 11*b*. The light projection system 11*a* emits oblique incident light to the wafer 4, and the light reception system 11*b* captures the reflected light on the opposite side. Based on the detection signal detected by the focus sensor 11, the control unit 13 (described below) measures the position in the Z-direction of the wafer 4 and controls the wafer stage 6 to move the wafer 4.

The wafer conveyance unit 12 conveys the wafer 4. The wafer conveyance unit 12 conveys the wafer 4 from a wafer storage container (not illustrated) that stores the wafer 4 to the wafer stage 6. The wafer conveyance unit 12 also conveys the wafer 4 from the wafer stage 6 to the wafer storage container.

The reticle conveyance unit 14 conveys the reticle 1. The reticle conveyance unit 14 conveys the reticle 1 from a reticle storage container (not illustrated) that stores the reticle 1 to the reticle stage 2. The reticle conveyance unit 14 also conveys the reticle 1 from the reticle stage 2 to the reticle storage container.

To perform alignment of the wafer 4 held by the wafer chuck 5, the alignment scope 15 acquires a digital image signal obtained by capturing an image of a mark formed on the wafer 4. The alignment scope 15 includes an image sensor that outputs a light-and-shade image signal based on the brightness, i.e., the light and shade, of the reflected light from the wafer 4, and an analog-to-digital (A/D) converter that converts the light-and-shade image signal obtained from the image sensor into the digital image signal. Using the acquired digital image signal, the control unit 13 (described below) detects the position of the mark formed on the wafer 4. Based on the detected position of the mark, the control unit 13 controls the wafer stage 6 to perform the alignment of the wafer 4.

The control unit 13 controls exposure processing on the wafer 4 by controlling the operation and adjustment of each of the components of the exposure apparatus 204. The control unit 13 is configured with, for example, a programmable logic device (PLD) (e.g., a field-programmable gate array (FPGA)), an application-specific integrated circuit (ASIC), or a computer in which a program is embedded, or the combination of all or some of these. The control unit 13 may be configured integrally with the other components of the exposure apparatus 204 (in a common housing), or may be configured separately from the other components of the exposure apparatus 204 (in a different housing). The control unit 13 applies information acquired from a storage device 304 (described below) and controls execution of the exposure processing (the pattern forming processing) on the wafer 4.

Figure 3:
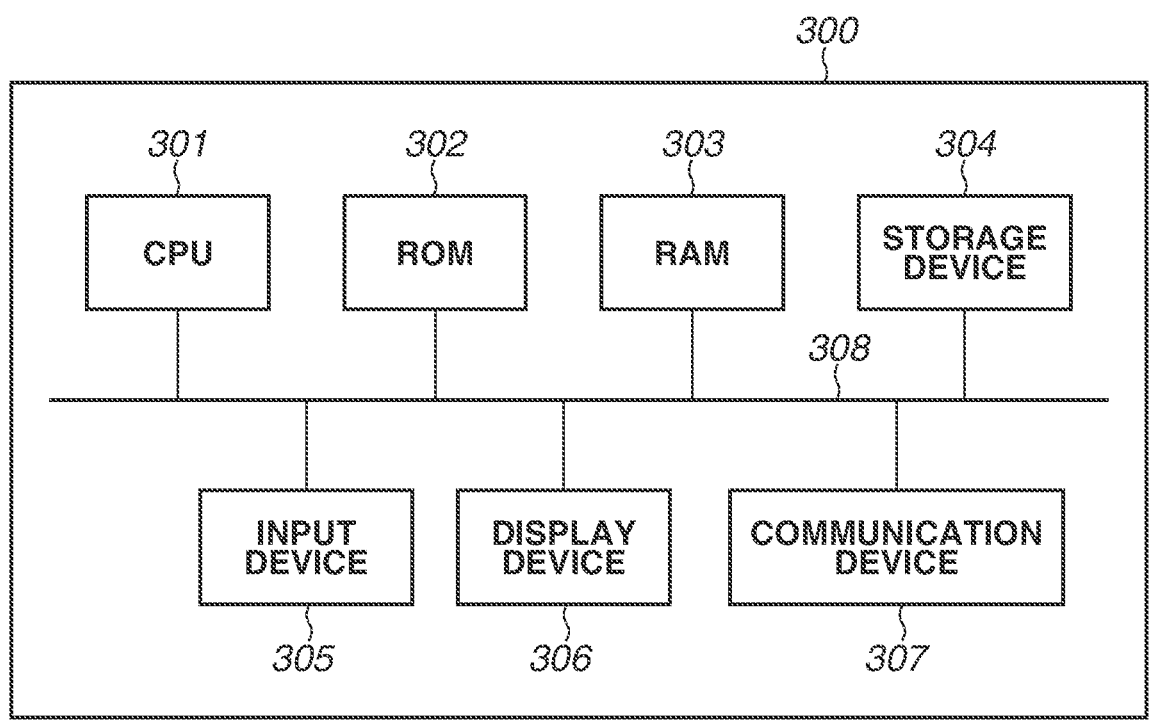
FIG. 3 is a diagram illustrating a hardware configuration of an information processing apparatus.

Next, the management apparatus 300 will be described. FIG. 3 illustrates a hardware configuration of the management apparatus 300 as an information processing apparatus. The management apparatus 300 (the information processing apparatus) includes a central processing unit (CPU) 301, a read-only memory (ROM) 302, a random-access memory (RAM) 303, the storage device 304, an input device 305, a display device 306, and a communication device 307. The hardware components of the management apparatus 300 (the information processing apparatus) function based on programs. In the example of FIG. 3, the CPU 301 performs calculation for control based on programs and controls the components connected to a bus 308. The ROM 302 stores programs and data. The RAM 303 is a readable and writable memory that saves programs and data. The RAM 303 is used to temporarily save data such as results of the calculation by the CPU 301. The storage device 304 is used to save programs and data.

The storage device 304 is also used as a temporary storage area for a program and data of an operating system (OS) of the management apparatus 300 (the information processing apparatus).

Although the input and output of data to and from the storage device 304 are slower than the input and output of data to and from the RAM 303, the storage device 304 can save a large amount of data. It is desirable that the storage device 304 should be a non-volatile storage device capable of saving data as permanent data, so that the data saved in the storage device 304 can be referenced over a long period of time. The storage device 304 is mainly a magnetic storage device (a hard disk drive (HDD)), but may be a device that reads and writes data with an external medium, such as a compact disc (CD), a digital versatile disc (DVD), or a memory card, attached to the device.

The input device 305 is used to input characters and data to the management apparatus 300 (the information processing apparatus), and corresponds to various keyboards and a mouse. The display device 306 functions as a user interface of the management apparatus 300 (the information processing apparatus) and displays information for the operation of the management apparatus 300 (the information processing apparatus) and processing results thereof, and corresponds to a cathode ray tube (CRT) monitor or a liquid crystal monitor. For example, in a case where a user can operate the display device 306 by touching a screen, like a touch panel, the display device 306 also functions as the input device 305. While the input device 305 and the display device 306 are described as parts of the management apparatus 300, the input device 305 and the display device 306 are not limited thereto, and for example, may be parts of the pattern forming apparatus 200.

The communication device 307 is used to connect to a network, perform data communication based on a communication protocol such as the Transmission Control Protocol/Internet Protocol (TCP/IP), and communicate with another apparatus. To enable high-speed calculation processing, the management apparatus 300 (the information processing apparatus) may include a graphics processing unit (GPU). The management apparatus 300 as the information processing apparatus is connected to a plurality of the exposure apparatuses 204 via the communication device 307 to perform data communication with the plurality of exposure apparatuses 204.

Figure 4:
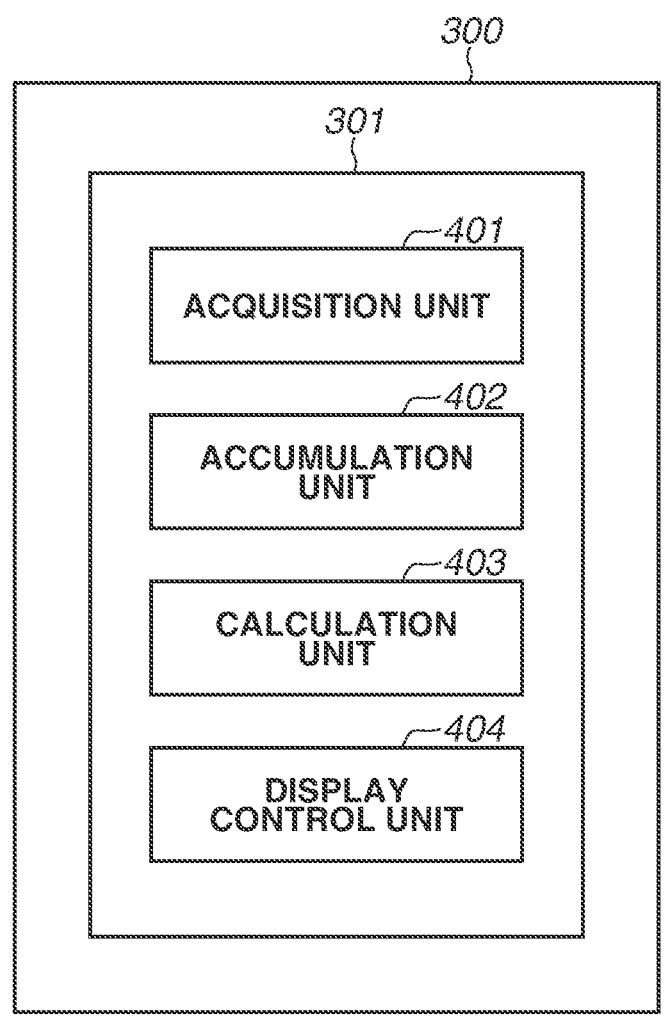
FIG. 4 is a diagram illustrating a configuration of a central processing unit (CPU).
Figure 5:
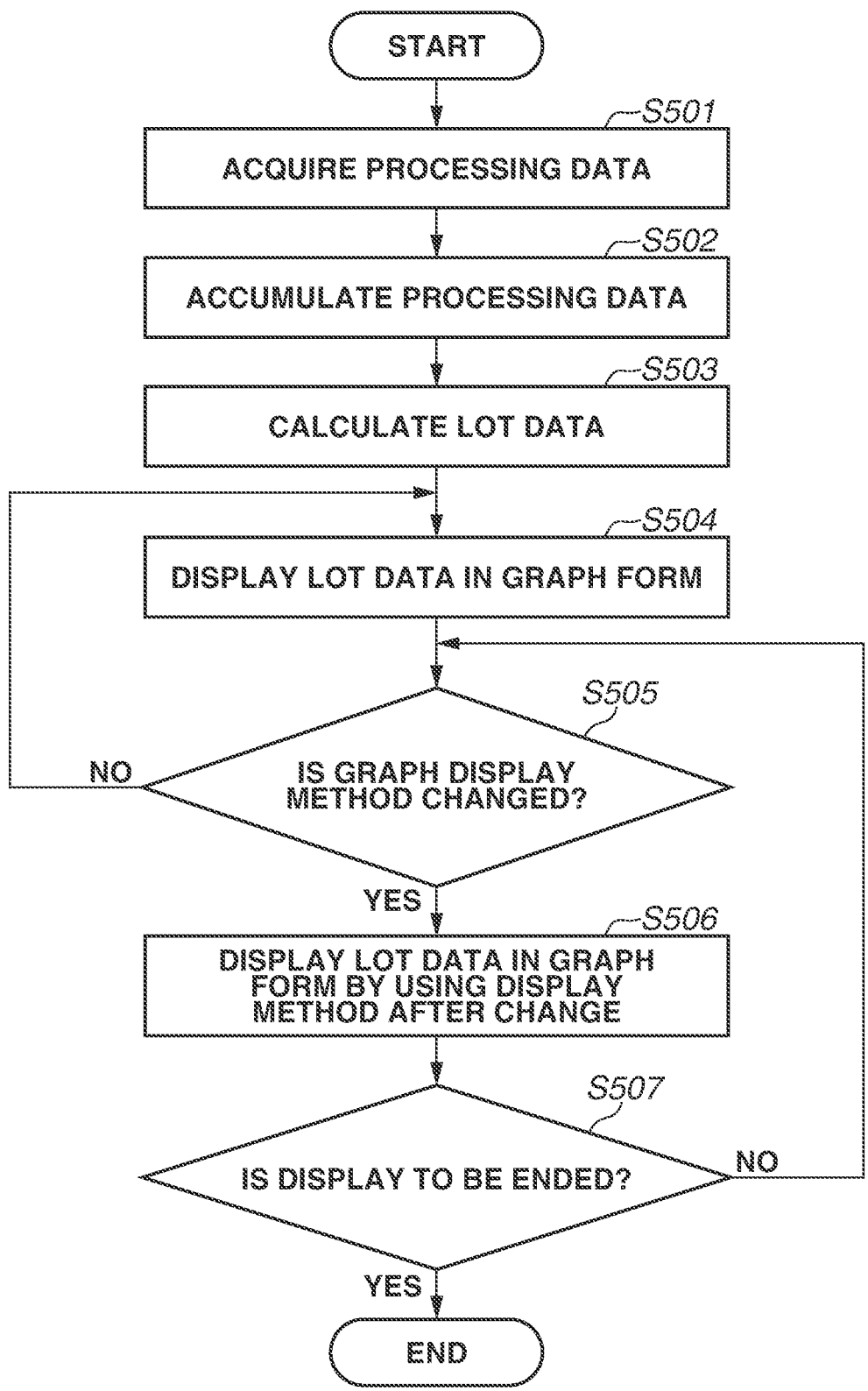
FIG. 5 is a flowchart illustrating processing for display on a display device.

FIG. 4 illustrates a configuration of the CPU 301 of the management apparatus 300. The CPU 301 includes an acquisition unit 401, an accumulation unit 402, a calculation unit 403, and a display control unit 404. FIG. 5 is a flowchart illustrating processing for displaying a user interface for analyzing an abnormality that occurs in the exposure apparatuses 204.

The processing for display on the display device 306 by the management apparatus 300 according to the present exemplary embodiment will be described below with reference to FIGS. 4 and 5. In the present exemplary embodiment, the display on the display device 306 can shorten the time to analyze the cause of an abnormality in the exposure apparatuses 204. Examples of the abnormality in the present exemplary embodiment include a severe abnormality that causes any of the exposure apparatuses 204 to stop, and an abnormality that decreases the accuracy of the exposure apparatuses 204 to affect productivity.

The flowchart in FIG. 5 will be described next. The processing in the flowchart in FIG. 5 is performed by the CPU 301. In step S501, the acquisition unit 401 acquires processing information about the exposure apparatuses 204. The processing information about the exposure apparatuses 204 includes processing data on the exposure apparatuses 204 and processing conditions applied when the exposure processing is performed. The processing data on the exposure apparatuses 204 is information including the operation result of each of the exposure apparatuses 204 and the state of the wafer 4 exposed by each of the exposure apparatuses 204. More specifically, the processing data includes synchronization accuracy data and alignment accuracy data. The synchronization accuracy data indicates an error in the relative position of the reticle stage 2 and the wafer stage 6 during the period when the reticle stage 2 and the wafer stage 6 are synchronously driven, for example, in the Y-axis direction in order to expose the target shot region. The alignment accuracy data is waveform data on the digital image signal obtained by capturing the image of the mark formed on the target wafer 4, and data indicating the evaluations of the digital image signal (the symmetry of the waveform data and the contrast of the digital image signal).

The processing conditions applied when the exposure processing is performed are a recipe determined for each wafer 4 to be produced, and an apparatus parameter determined for each of the exposure apparatuses 204. The recipe is a processing condition shared by the plurality of exposure apparatuses 204, and the apparatus parameter is a processing condition not shared by the plurality of exposure apparatuses 204. Examples of the recipe include an exposure amount for exposing the wafer 4 and an individual correction value and algorithm selected for following the exposed pattern. Examples of the apparatus parameter include a correction value for the projection optical system 3, and a control method and a control parameter for the wafer stage 6. The processing conditions are not limited thereto, and a parameter defining another processing condition may also be displayed.

Next, in step S502, the accumulation unit 402 accumulates the processing data and the processing conditions about the exposure apparatuses 204 that are acquired in step S501. For example, as the processing data, processing data on a wafer-by-wafer (a substrate-by-substrate) basis is accumulated in the accumulation unit 402.

In step S503, based on the processing data on a wafer-by-wafer basis accumulated in the accumulation unit 402, the calculation unit 403 calculates lot data that is processing data on a lot-by-lot basis. The lot data is calculated based on the statistical value (e.g., the maximum value, the minimum value, the average value, the median value, or the standard deviation) of the processing data on a wafer-by-wafer basis. The lot data may be calculated not by the calculation unit 403 but by each of the exposure apparatuses 204. For example, the acquisition unit 401 may acquire the lot data calculated by each of the exposure apparatuses 204 from each of the exposure apparatuses 204, and the processing may proceed to step S504.

Figure 6:
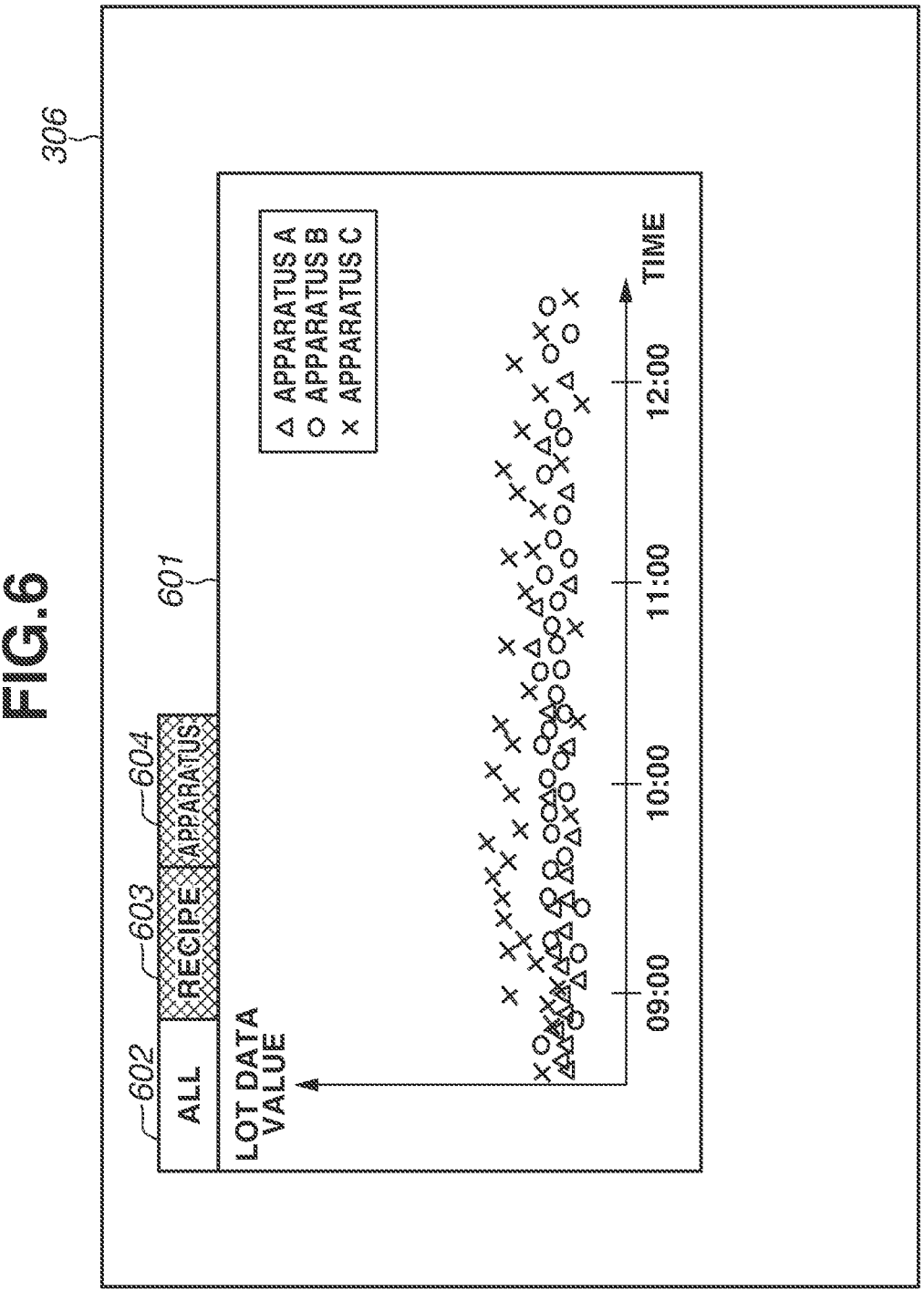
FIG. 6 is a diagram illustrating a graph where pieces of lot data classified by exposure apparatus are displayed.

In step S504, the display control unit 404 outputs the lot data calculated in step S503 to the display device 306, and displays a graph such as a graph 601 illustrated in FIG. 6 on the display device 306. In the graph 601, the pieces of lot data classified according the plurality of exposure apparatuses 204 are collectively displayed. The pieces of lot data in the graph 601 are displayed in chronological order. The horizontal axis of the graph 601 represents the time when the exposure processing is performed. The vertical axis of the graph 601 represents a lot data value that is a value of the processing data on a lot-by-lot basis. Since the pieces of lot data classified according to the plurality of exposure apparatuses 204 are collectively displayed, it is possible to view the overall tendency, but it is difficult to determine the data variation tendency that a particular apparatus has.

In FIG. 6, a method for displaying the graph 601 can be changed using switch buttons 602, 603, and 604. FIG. 6 illustrates a state where the switch button 602 is selected.

The user can change the method for displaying the graph 601 by selecting an unselected button from among the switch buttons 602, 603, and 604. The switch buttons 602, 603, and 604 may be integrated into a single button.

In step S505, the display control unit 404 determines whether the graph display method is changed. More specifically, the display control unit 404 determines whether the user selects an unselected button from among the switch buttons 602, 603, and 604. If an unselected button is selected (YES in step S505), the processing proceeds to step S506. The selection of the switch button is implemented by the input device (the computer input device) 305 such as a mouse, a keyboard, or a touch panel, and a program for controlling the input device 305.

Figure 7:
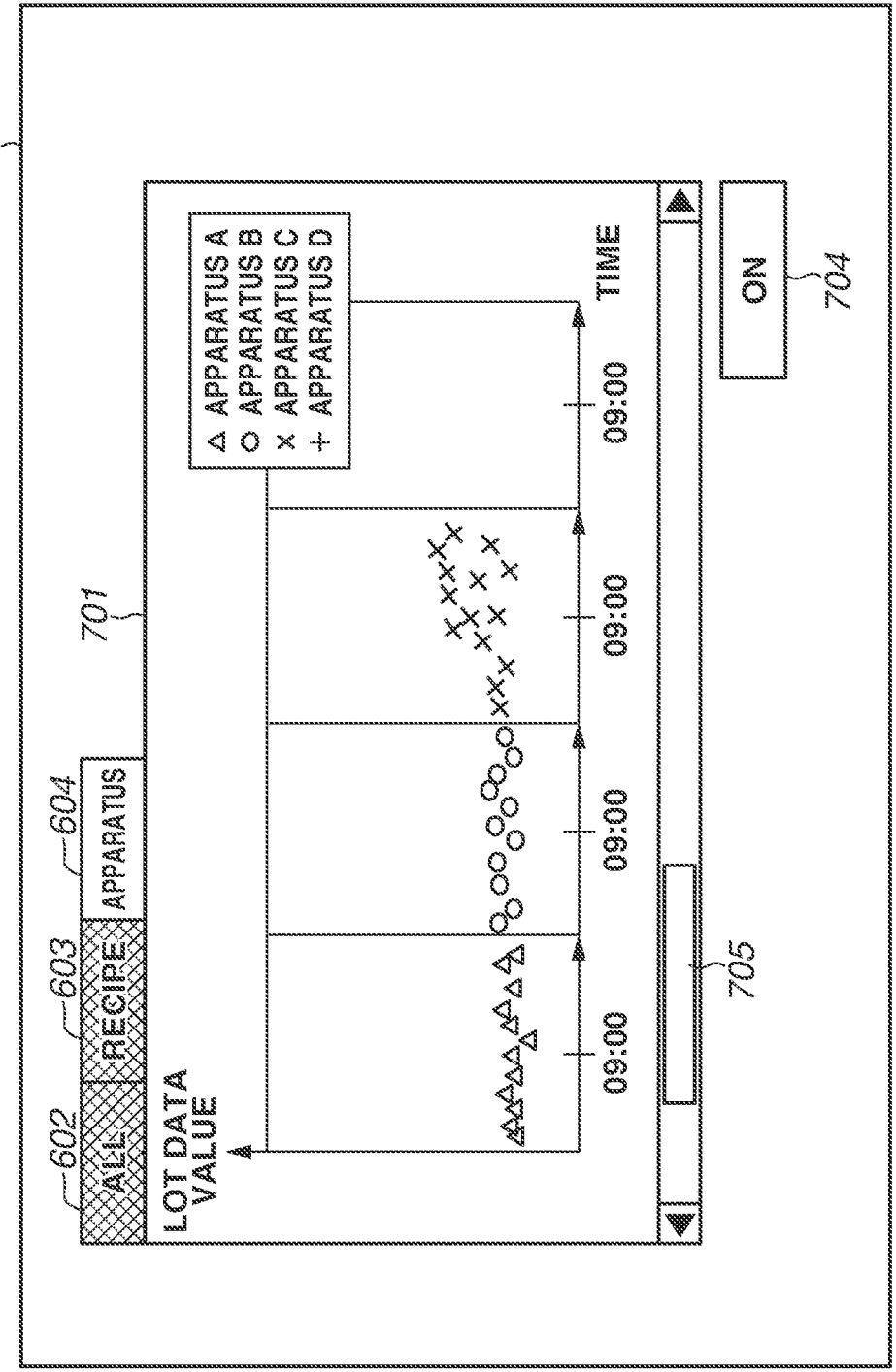
FIG. 7 is a diagram illustrating a graph where the pieces of lot data classified by exposure apparatus are displayed in different regions.

In step S506, the display control unit 404 outputs the lot data calculated in step S503, to the display device 306 and displays the lot data on the display device 306 as illustrated in FIG. 7. FIG. 7 illustrates a graph 701 displayed when the switch button 604 is selected.

In the graph 701, a display region is provided separately for each of the plurality of exposure apparatuses 204, and the pieces of lot data classified according to the plurality of exposure apparatuses 204 are displayed in different display regions. The pieces of lot data in the graph 701 are displayed in chronological order. The horizontal axis of the graph 701 represents the time when the exposure processing is performed, and is divided according to the plurality of exposure apparatuses 204. The vertical axis of the graph 701 represents the lot data value that is the value of the processing data on a lot-by-lot basis. For example, lot data (first processing data) on an exposure apparatus A as a first substrate processing apparatus among the plurality of exposure apparatuses 204 is plotted as an icon "Δ", and lot data (second processing data) on an exposure apparatus B as a second substrate processing apparatus among the plurality of exposure apparatuses 204 is plotted as an icon "○".

A scroll bar 705 is used to change the display range of the horizontal axis of the graph 701, and enables the lot data in a time period not displayed in FIG. 7 to be displayed on the display device 306. In FIG. 7, for an exposure apparatus D among the plurality of exposure apparatuses 204, the lot data to be displayed does not exist and thus nothing is displayed.

As illustrated in FIG. 7, the lot data display region is provided separately for each of the plurality of exposure apparatuses 204, so that it is possible to easily estimate that an abnormality is caused by a particular exposure apparatus among the plurality of exposure apparatuses 204. In FIG. 7, the lot data on an exposure apparatus C varies widely and thus it is possible to estimate that some kind of abnormality occurs in the exposure apparatus C. As a result, the user can quickly perform a procedure for eliminating the abnormality. This results in shortening the downtime of the exposure apparatus C and improving productivity.

Figure 8:
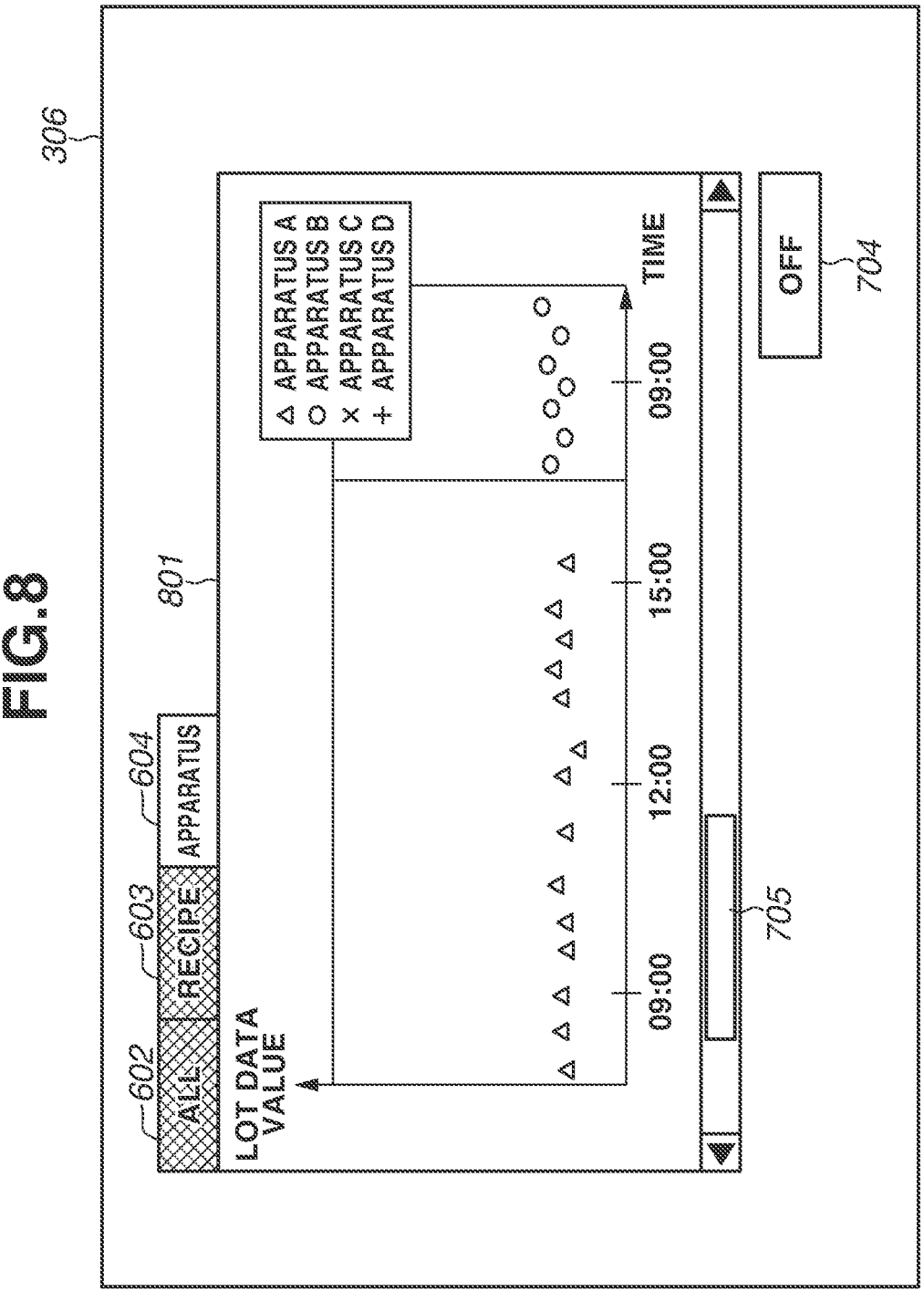
FIG. 8 is a diagram illustrating a graph obtained by changing a display range of the graph illustrated in FIG. 7.

A setting button 704 is used to set whether to display the graph 701 in a state where the display regions in the display range of the horizontal axis are uniform among the plurality of exposure apparatuses 204. In a state where the setting button 704 is "ON" as illustrated in FIG. 7, the displayed time ranges are uniform among the plurality of exposure apparatuses 204 for each recipe as illustrated in the graph 701. On the other hand, FIG. 8 illustrates a state where the setting button 704 is "OFF". Similarly to FIG. 7, FIG. 8 illustrates the state where the pieces of lot data classified according to the plurality of exposure apparatuses 204 are displayed in different display regions. However, in a graph 801 illustrated in FIG. 8, the displayed time ranges differ among the plurality of exposure apparatuses 204. Thus, in a case where the lot data on a particular exposure apparatus among the plurality of exposure apparatuses 204 changes over time, it is possible to view the overall tendency of the lot data on the particular exposure apparatus. This display method facilitates the determination of the tendency. Moreover, the display range can be changed using the scroll bar 705, and an exposure apparatus as a display target may be selectable separately.

In step S507, if the end of the display of the screen is selected by the user (YES in step S507), the display on the display device 306 is ended. If the end of the display of the screen is not selected (NO in step S507), the processing returns to step S505. In step S505, the display control unit 404 continues to determine whether the graph display method is changed.

Figure 9:
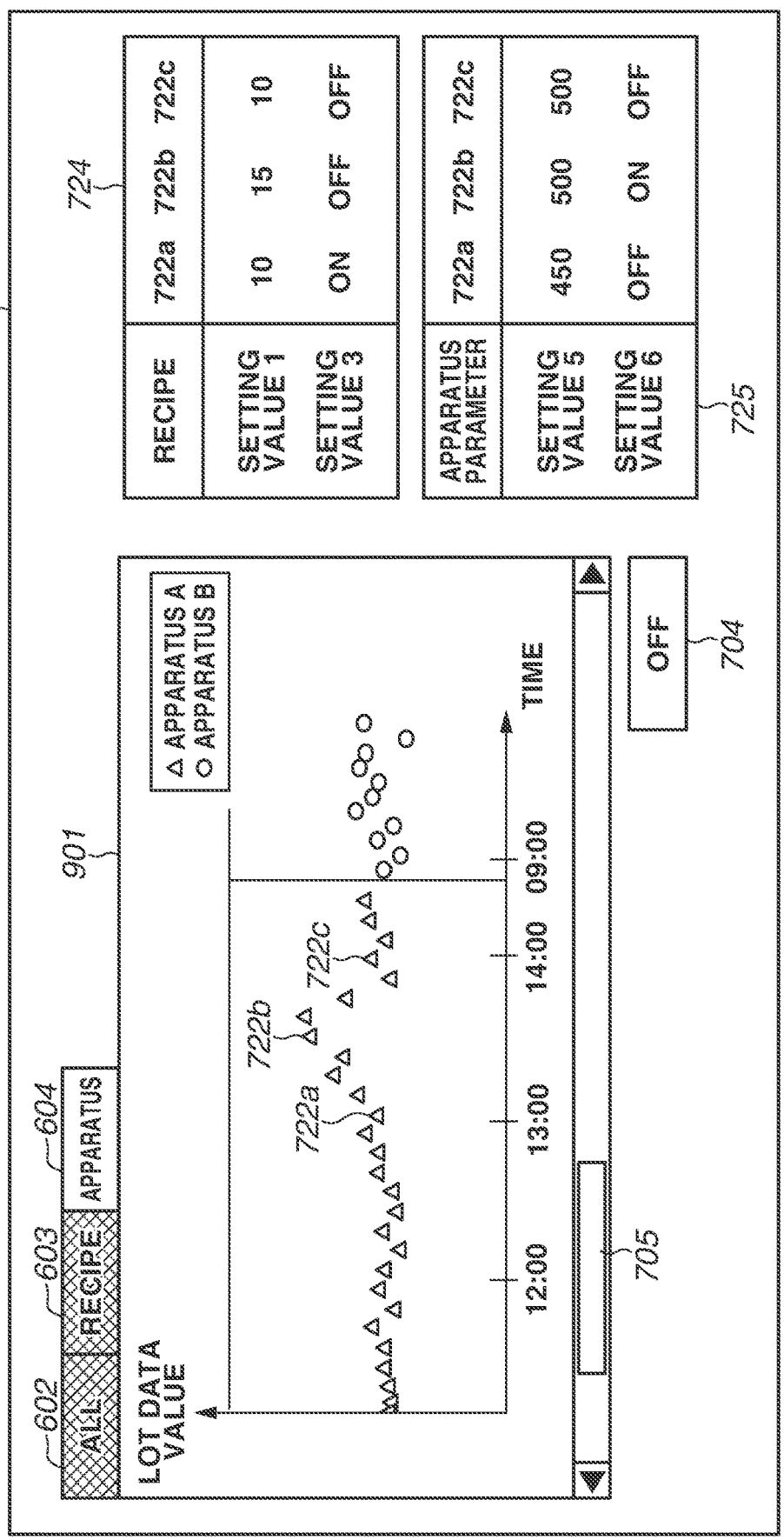
FIG. 9 is a diagram illustrating processing conditions that are displayed in addition to the pieces of lot data classified by exposure apparatus.

At this time, as illustrated in FIG. 9, processing conditions 724 and 725 about the exposure apparatuses 204 specified by the user may be displayed in addition to the graph 801 illustrated in FIG. 8. A lot is specified when the user selects one of the pieces of lot data plotted in a graph 901 or inputs a lot name. The specification of the lot is implemented by the input device (the computer input device) 305, such as a mouse, a keyboard, or a touch panel, and a program for controlling the input device 305.

The processing condition 724 indicates recipe parameters applied to pieces of lot data 722a to 722c. The processing condition 725 indicates apparatus parameters applied to the pieces of lot data 722a to 722c. In the parameters displayed in the processing conditions 724 and 725, a parameter having a difference among the pieces of lot data 722a to 722c may be highlighted or the other parameters may be hidden so that the user can easily compare the pieces of lot data 722a to 722c. Alternatively, the parameters may be displayed in preset priority order, or a parameter determined as unnecessary based on preset information may be hidden.

In the example of FIG. 9, the user first searches the graph 901 for feature points indicating changes in the lot data. The user specifies the feature points and the pieces of lot data 722a to 722c around the feature points. The display device 306 displays the processing conditions 724 and 725 applied to the pieces of lot data 722a to 722c. Based on the displayed processing conditions 724 and 725, the user can determine that changes in setting values 1, 3, 5, and 6 are related to the change of tendency in the lot data. Thus, the user can correct the setting of the setting values 1, 3, 5, and 6 to eliminate the abnormality.

In the graphs 601 to 901 illustrated in FIGS. 6 to 9, the lot data on the exposure apparatus A is plotted as the icon "Δ" (the first icon), the lot data on the exposure apparatus B is plotted as the icon "○" (the second icon), the lot data on the exposure apparatus C is plotted as an icon "x", and the lot data on the exposure apparatus D is plotted as an icon "+". In the graphs 601 to 901, the shapes of the icons may be changed appropriately, or the colors of the icons may be changed among the plurality of exposure apparatuses 204.

Assuming that the screen illustrated in FIG. 7 is a first screen and the screen illustrated in FIG. 6 is a second screen, the display control unit 404 may selectively display one of the first screen and the second screen, or may simultaneously display the first screen and the second screen.

In a second exemplary embodiment, an example where the display of an optimal graph for identifying the cause of an abnormality is selectively switched. Matters that are not mentioned in the present exemplary embodiment are according to the first exemplary embodiment.

Figure 10:
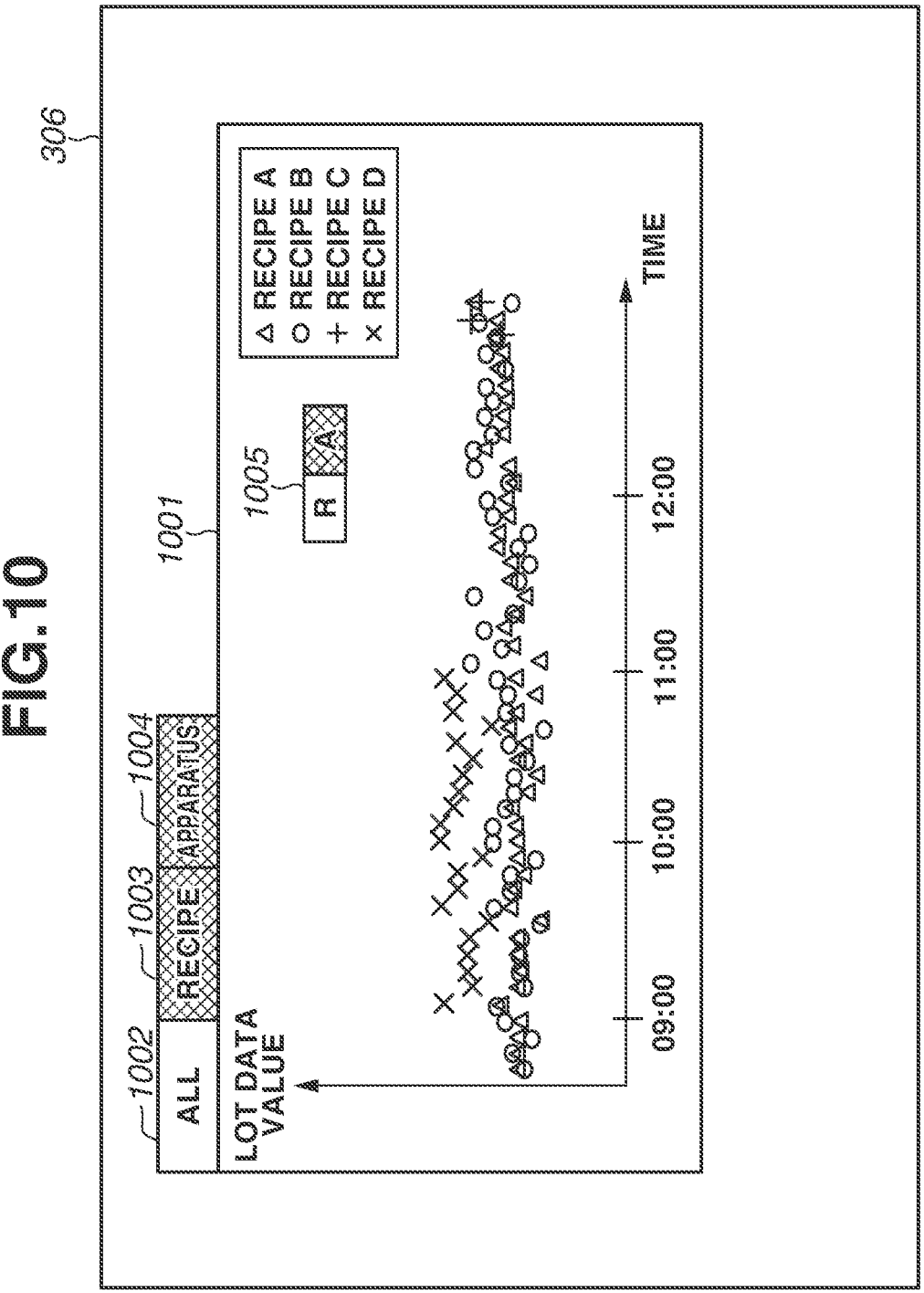
FIG. 10 is a diagram illustrating a graph where pieces of lot data classified by processing condition are displayed.

In a graph 1001 illustrated in FIG. 10, pieces of lot data classified according to a plurality of exposure conditions (recipes) are collectively displayed. Similarly to the graph 601 in FIG. 6, the pieces of lot data in the graph 1001 are displayed in chronological order. The horizontal axis of the graph 1001 represents the time when the exposure processing is performed. The vertical axis of the graph 1001 represents the lot data value that is the value of the processing data on a lot-by-lot basis.

Similarly to the first exemplary embodiment, a method for displaying the graph 1001 can be changed using switch buttons 1002, 1003, and 1004. FIG. 10 illustrates a state where the switch button 1002 is selected. The user can change the method for displaying the graph 1001 by selecting an unselected button from among the switch buttons 1002, 1003, and 1004. The switch buttons 1002, 1003, and 1004 may be integrated into a single button. A button 1005 is used to switch between the display of FIG. 6 and the display of FIG. 10. In FIG. 10, "R" (Recipe) on the button 1005 is selected and the pieces of lot data classified by recipe are collectively displayed. The user can also select "A" (Apparatus) by operating the button 1005. If "A" (Apparatus) on the button 1005 is selected, the pieces of lot data classified according to the plurality of exposure apparatuses 204 are collectively displayed as illustrated in FIG. 6.

Figure 11:
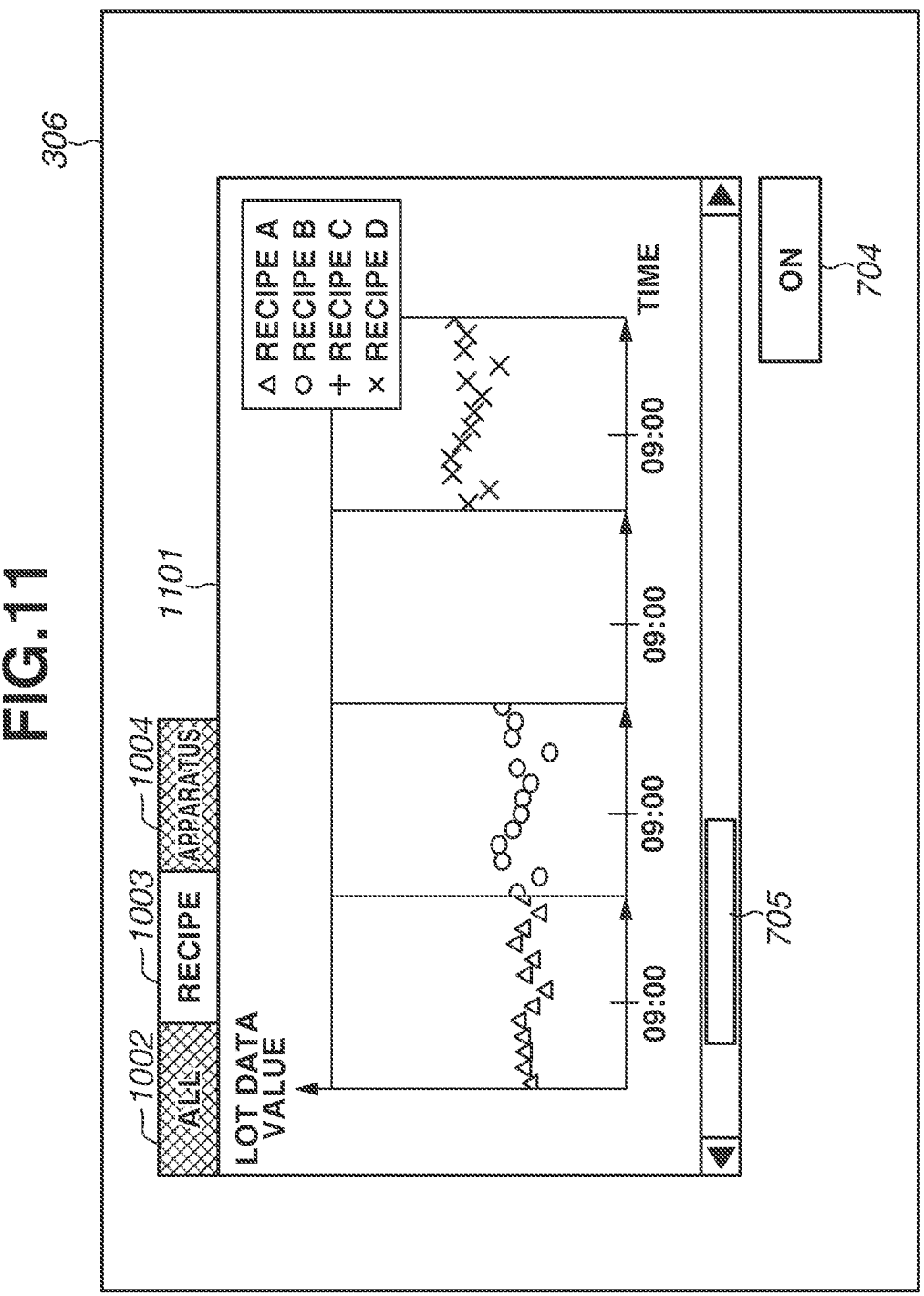
FIG. 11 is a diagram illustrating a graph where the pieces of lot data classified by processing condition are displayed in different regions.

FIG. 11 illustrates a graph 1101 displayed when the switch button 1003 is selected. In the graph 1101, a display region is provided separately for each of recipes A, B, C, and D, and the pieces of lot data classified by recipe are displayed in different display regions. The pieces of lot data in the graph 1101 are displayed in chronological order. The horizontal axis of the graph 1101 represents the time when the exposure processing is performed and the horizontal axis is divided by recipe. The vertical axis of the graph 1101 represents the lot data value that is the value of the processing data on a lot-by-lot basis.

The lot data is displayed for each of the processing conditions (e.g., the recipes A to D), so that the user can easily recognize that the lot data on a particular recipe noticeably changes over time.

When analyzing the cause of an abnormality, the user can selectively switch the display of an optimal graph for identifying the cause. For example, in a case where an abnormality occurs in a particular exposure apparatus, the pieces of lot data classified according to the exposure apparatuses 204 are displayed as illustrated in FIG. 7. As a result, since the lot data on the exposure apparatus C varies widely, it is possible to estimate that some kind of abnormality occurs in the exposure apparatus C.

In a case where an abnormality occurs in a particular recipe, the pieces of lot data classified by recipe are displayed as illustrated in FIG. 11. As a result, since the lot data on the recipe D varies widely, it is possible to estimate that some kind of abnormality occurs in the exposure processing based on the recipe D.

As described above, the lot data display method is appropriately switched, so that the user can easily estimate the cause of an abnormality. As a result, the user can quickly perform a procedure for eliminating the abnormality. The elimination of the abnormality in the exposure apparatuses 204 at an early stage leads to shortening the apparatus downtime and improving productivity.

In the graphs 1001 and 1101 in FIGS. 10 and 11, the lot data on the recipe A is plotted as the icon "Δ", the lot data on the recipe B is plotted as the icon "○", the lot data on the recipe C is plotted as the icon "+", and the lot data on the recipe D is plotted as the icon "x". In the graphs 1001 and 1101, the shapes of the icons may be changed appropriately, or the colors of the icons may be changed for each recipe.

Assuming that the screen illustrated in FIG. 7 is the first screen and the screen illustrated in FIG. 11 is a third screen, the display control unit 404 may selectively display one of the first screen and the third screen, or may simultaneously display the first screen and the third screen.

In the first and second exemplary embodiments, the lot data has been described as the statistical value of processing data on a single lot. The exemplary embodiments, however, are not limited thereto. Alternatively, the lot data may be the statistical value of processing data on a plurality of lots to which the same recipe is applied.

In the first and second exemplary embodiments, the analysis of an abnormality in the exposure apparatus 204 as the pattern forming apparatus 200 has been described. Alternatively, the screen displayed on the display device 306 may be used for the analysis of an abnormality in any other apparatus. For example, the screen displayed on the display device 306 may be used for the analysis of an abnormality in the processing apparatus 201 such as the application apparatus, the developing apparatus, or the etching apparatus, or may be used for the analysis of an abnormality in the inspection apparatus 202 such as the overlay inspection apparatus, the line width inspection apparatus, or the pattern inspection apparatus.

<Article Manufacturing Method>

An article manufacturing method according to an exemplary embodiment of the present disclosure is suitable for, for example, manufacturing an article such as a micro device, (e.g., a semiconductor device) or an element having a fine structure. The article manufacturing method according to the present exemplary embodiment can include a formation process for forming a pattern of an original on a substrate by using the above-described article manufacturing system 100, and a processing process for processing the substrate on which the pattern is formed in the formation process. Furthermore, the article manufacturing method can include other known processes (oxidation, film formation, deposition, doping, planarization, etching, resist removal, dicing, bonding, and packaging). The article manufacturing method according to the present exemplary embodiment has an advantage over a conventional method in at least one of the performance, the quality, the productivity, and the production cost of the article.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016442, filed Feb. 4, 2021, which is hereby incorporated by reference herein in its entirety.

What is claimed is:

1. An information processing apparatus comprising:
an acquisition unit configured to acquire information including first processing data indicating a result of substrate processing performed by a first substrate processing apparatus, and second processing data indicating a result of substrate processing performed by a second substrate processing apparatus different from the first substrate processing apparatus; and
a display control unit configured to control display on a display device based on the information acquired by the acquisition unit,
wherein the display control unit displays the first processing data and the second processing data in different regions, and displays information indicating a processing condition under which the substrate processing is performed, and
the processing condition includes a recipe that is a processing condition shared by a plurality of apparatuses including the first substrate processing apparatus and the second substrate processing apparatus, and an apparatus parameter that is a processing condition not shared by the plurality of apparatuses.

2. The information processing apparatus according to claim 1, wherein the display control unit arranges and displays the first processing data and the second processing data in chronological order.

3. The information processing apparatus according to claim 2, wherein the display control unit changes a display range of at least one of the first processing data or the second processing data.

4. The information processing apparatus according to claim 1, wherein the display control unit displays, on the display device, a first icon indicating the first processing data and a second icon indicating the second processing data different from the first icon.

5. The information processing apparatus according to claim 4, wherein a color of the first icon and a color of the second icon are different from each other.

6. The information processing apparatus according to claim 4, wherein a shape of the first icon and a shape of the second icon are different from each other.

7. The information processing apparatus according to claim 1, further comprising a calculation unit configured to calculate processing data on a lot-by-lot basis based on processing data on a substrate-by-substrate basis acquired by the acquisition unit.

8. The information processing apparatus according to claim 7, wherein the calculation unit calculates the processing data on a lot-by-lot basis based on statistical processing that calculates one of a maximum value, a minimum value, an average value, a median value, and a standard deviation of the processing data on a substrate-by-substrate basis acquired by the acquisition unit.

9. The information processing apparatus according to claim 1, wherein the display control unit displays, on the display device, a first screen where the first processing data and the second processing data are displayed in the different regions.

10. The information processing apparatus according to claim 9, wherein the display control unit selectively displays, on the display device, the first screen and a second screen where the first processing data and the second processing data are displayed in a same region.

11. The information processing apparatus according to claim 9, wherein the display control unit simultaneously displays, on the display device, the first screen and a second screen where the first processing data and the second processing data are displayed in a same region.

12. The information processing apparatus according to claim 9,
wherein the display control unit displays, on the display device, a third screen where third processing data indicating a result of substrate processing performed under a first processing condition and fourth processing data indicating a result of substrate processing performed under a second processing condition different from the first processing condition are displayed in different regions, and wherein the display control unit selectively displays the first screen and the third screen on the display device.

13. The information processing apparatus according to claim 1, wherein the first processing data is information including an operation result of the first substrate processing apparatus and a state of a substrate subjected to the substrate processing by the first substrate processing apparatus, and the second processing data is information including an operation result of the second substrate processing apparatus and a state of a substrate subjected to the substrate processing by the second substrate processing apparatus.

14. An information processing method comprising:
acquiring information including first processing data indicating a result of substrate processing performed by a first substrate processing apparatus, and second processing data indicating a result of substrate processing performed by a second substrate processing apparatus different from the first substrate processing apparatus; and
controlling display on a display device based on the acquired information,
wherein in the controlling, the first processing data and the second processing data are displayed in different regions, and information indicating a processing condition under which the substrate processing is performed is displayed, and
the processing condition includes a recipe that is a processing condition shared by a plurality of apparatuses including the first substrate processing apparatus and the second substrate processing apparatus, and an apparatus parameter that is a processing condition not shared by the plurality of apparatuses.

15. A non-transitory computer-readable storage medium storing a program for causing a computer to execute an information processing method comprising:
acquiring information including first processing data indicating a result of substrate processing performed by a first substrate processing apparatus, and second processing data indicating a result of substrate processing performed by a second substrate processing apparatus different from the first substrate processing apparatus; and
controlling display on a display device based on the acquired information,
wherein in the controlling, the first processing data and the second processing data are displayed in different regions, and information indicating a processing condition under which the substrate processing is performed is displayed, and
the processing condition includes a recipe that is a processing condition shared by a plurality of apparatuses including the first substrate processing apparatus and the second substrate processing apparatus, and an apparatus parameter that is a processing condition not shared by the plurality of apparatuses.

16. An article manufacturing system comprising:
a pattern forming apparatus configured to form a pattern on a substrate; and
an information processing apparatus configured to manage a plurality of apparatuses including the pattern forming apparatus,
wherein the information processing apparatus includes:
an acquisition unit configured to acquire information including first processing data indicating a result of substrate processing performed by a first substrate processing apparatus, and second processing data indicating a result of substrate processing performed by a second substrate processing apparatus different from the first substrate processing apparatus; and
a display control unit configured to control display on a display device based on the information acquired by the acquisition unit, and
wherein the display control unit displays the first processing data and the second processing data in different regions, and displays information indicating a processing condition under which the substrate processing is performed, and
the processing condition includes a recipe that is a processing condition shared by a plurality of apparatuses including the first substrate processing apparatus and the second substrate processing apparatus, and an apparatus parameter that is a processing condition not shared by the plurality of apparatuses.

17. An article manufacturing method comprising:
forming a pattern on a substrate by using an article manufacturing system including a pattern forming apparatus configured to form a pattern on a substrate, and an information processing apparatus configured to manage a plurality of apparatuses including the pattern forming apparatus;
processing the substrate on which the pattern is formed, by performing at least one of oxidation, film formation, deposition, doping, planarization, etching, resist removal, dicing, bonding, or packaging; and
manufacturing an article from the processed substrate,
wherein the information processing apparatus includes:
an acquisition unit configured to acquire information including first processing data indicating a result of substrate processing performed by a first substrate processing apparatus, and second processing data indicating a result of substrate processing performed by a second substrate processing apparatus different from the first substrate processing apparatus; and
a display control unit configured to control display on a display device based on the information acquired by the acquisition unit, and
wherein the display control unit displays the first processing data and the second processing data in different regions, and displays information indicating a processing condition under which the substrate processing is performed, and
the processing condition includes a recipe that is a processing condition shared by a plurality of apparatuses including the first substrate processing apparatus and the second substrate processing apparatus, and an apparatus parameter that is a processing condition not shared by the plurality of apparatuses.

* * * * *